United States Patent [19]

Haddock

[11] Patent Number: 5,742,736
[45] Date of Patent: Apr. 21, 1998

[54] DEVICE FOR MANAGING VOICE DATA AUTOMATICALLY LINKING MARKED MESSAGE SEGMENTS TO CORRESPONDING APPLICATIONS

[75] Inventor: Nicholas John Haddock, Bristol, Great Britain

[73] Assignee: Hewlett-Packard Company, Palo Alto, Calif.

[21] Appl. No.: 424,204

[22] Filed: Apr. 19, 1995

[30] Foreign Application Priority Data

Apr. 22, 1994 [GB] United Kingdom ............... 9408042

[51] Int. Cl.$^6$ .................. G01L 3/00; G11C 11/00
[52] U.S. Cl. .................. 395/2.79; 395/2.1; 395/2.2; 379/89
[58] Field of Search .............. 395/2.1, 2.2, 2.79, 395/2.19, 2.6; 379/89

[56] References Cited

U.S. PATENT DOCUMENTS

| 5,481,645 | 1/1996 | Bertino ................... 395/2.79 |
| 5,526,407 | 6/1996 | Russell et al. ............... 379/89 |

FOREIGN PATENT DOCUMENTS

| WO92/02009 | 2/1992 | WIPO ............... G05G 5/00 |
| WO92/11634 | 7/1992 | WIPO ............... G09G 7/00 |

OTHER PUBLICATIONS

"Ubiquitous Audio: Capturing Spontaneous Collaboration", D. Hindus et al., Precedings of the Conf. on Computer–Supported Cooperative WOrk, 31 Oct. 1992, pp. 210–217.

"Working wih Audio: Integrating Personal Tape Recorders and Desktop Computers" L. Degen et al. Chi 92 Conf. Proc. ACM Conf. on Human Factors in Comp. Syst., 3 May 1992.

"Method of Categorizing Concatenated Phone Messages Into Messages Logs", IBM Tech. Disc. Bulletin, Vo. 36, No. 09B, Sep. 1993.

Categorical Storage of Voice Mail Messages, IBM Tech. Discl. Bulletin, vol. 36, No. 6B, Jun. 1993 pp. 169–170.

"Caltalk: A Multi-Media Calendar", C. Schmandt, Proc. of the 1990 Conf. the American Voice I/O Society, 1990, San Jose pp. 71–75.

Search Report for counterpart Application No. 9408042.1.

*Primary Examiner*—Allen R. MacDonald
*Assistant Examiner*—Tálivaldis Ivars Šmits

[57] ABSTRACT

The present invention concerns a device for managing voice data. The embodiment described comprises apparatus for displaying a visual representation of a voice message and processor circuitry for associating markers with segments of the message. The markers are indicative of particular storage areas, e.g. a telephone number storage area, a calendar storage area etc. Association of a marker with a segment of a voice message automatically causes that segment to be linked with the corresponding storage area so that the segment can later be retrieved in the context of a user interface for that particular storage area.

16 Claims, 3 Drawing Sheets

DEVICE FOR MANAGING VOICE DATA AUTOMATICALLY LINKING MARKED MESSAGE SEGMENTS TO CORRESPONDING APPLICATIONS

TECHNICAL FIELD

The present invention relates to a device designed to facilitate the management of voice data. Voice messages, left on a recipient's answerphone or delivered via a voicemail system are a popular form of person-to-person communication. Such voice messages are quick to generate for the sender but are relatively difficult to review for the recipient; speech is slow to listen to and, unlike inherently visual forms of messages such as electronic mail or handwritten notes, cannot be quickly scanned for the relevant information. The present invention aims to make it easier for users to extract relevant information from voice messages, and other kinds of voice record, such as recordings of meetings and recorded dictation.

In the long-term it would be desirable to approach this problem by automatically translating speech into text using speech recognition. Unfortunately this approach is not yet practical, since current speech recognition technology cannot accurately transcribe naturally-occurring speech of the kind found in voice messages. Therefore a number of approaches have been developed which help users to review voice data without actually recognising the speech signal and which provide for the display, structuring and annotation of speech recordings.

BACKGROUND ART

Many approaches assume, but do not necessarily depend on, an underlying technique for displaying a visual representation of speech. One such form of display is a single graphical line, graduated with time markings from start to finish (for example, a 4 second message may contain the appropriately spaced labels "0 sec", "1 sec", "2 sec", "3 sec", "4 sec"). In addition, an algorithm can be used to process the speech record to distinguish the major portions of speech from the major portions of silence. Such an algorithm is described by Arons (1994, Chapter 4). This permits a richer form of graphical display, in which the speech record is still portrayed along a timeline, but with portions of speech displayed as dark segments (for example) and the detected portions of silence displayed as light segments. Four pieces of prior art will be referred to:

1. A paper in the proceedings of CHI '92 entitled "Working with Audio: Integrating Personal Tape Recorders and Desktop Computers" by Degen, Mander and Saloman (1992) describes a prototype hand-held personal tape recorder. This is similar to a conventional "dictaphone" except that the user can place index points on the recording by pressing a button at the appropriate point in the recording. Two index buttons are available and these have no predetermined meaning. The user is free to place their own interpretation on the two forms of index. The recording can be downloaded to a personal computer and the inserted index points can be displayed along the timeline of the message. By visually displaying the index points, the user is reminded of an area of interest in the speech recording and can selectively play back portions of speech by using a pointing device such as a mouse. In addition, the index points can be searched for within the recording.

2. The NoteTaker product from InkWare Development Corp. (1994) extends this idea in the context of computer-based handwritten notes, rather than speech. Here users can select one of a variety of visual labels, representing for example "Urgent!", "Call" or "Action", and associate these with selected parts of a handwritten note. The program then allows the user to find all notes containing a particular label, an "Action" item for example.

3. Ades and Swinehart (1986) have built a prototype system for annotating and editing speech records. This system is the subject of their paper entitled "Voice Annotation and Editing in a Workstation Environment" from Xerox Corporation. In particular, an arbitrary text annotation can be placed on a visually displayed segment of speech as a cue to the content of that portion of speech.

4. A paper entitled "Capturing, Structuring and Representing Ubiquitous Audio" by Hindus, Schmandt and Horner (ACM Transactions on Information Systems, Vol 11, No.4 October 1993, pages 376–400) describes a prototype system for handling speech which allows the user to select a portion of visually displayed speech and to associate the depicted speech portion (such as by "drag-and-drop" using a mouse) with another application, such as a calendar. The calendar may contain independently entered, standard textual data (such as "Meeting with Jim"), as well as audio annotations and additions associated in this way.

Referring to the prior art items numbered 1–4 above, approaches (1)–(3) offer annotations which the user can employ as a visual cue to relevant parts of the speech (or handwriting, in the case of (2)). In (1), two labels are available with no predefined meaning. In (2), the user can choose from a broader set of labels, the appearance of which suggests a particular use (eg. the user should use the "Call" label for tagging items about telephoning people). In (3), the user can tag speech with an arbitrary textual entry, thus providing an even richer form of annotation. However, in all these approaches the label plays only a passive role in organising the target data. It is a passive visual and searchable cue to parts of the speech, and does not help the broader integration of the speech with other relevant applications in the user's personal information environment.

Approach (4) addresses this problem by allowing users to associate selected speech clips into, for example, a text-based calendar. A disadvantage of this approach is that it is rather laborious—the user must identify the appropriate speech clip, select it, and then associate it with another application. In addition, not all user interfaces lend themselves to this approach.

DISCLOSURE OF INVENTION

According to the present invention we provide a device for storing speech input comprising:

means for specifying a marker having a particular connotation;

means for associating the marker with all or part of the speech input;

and means for automatically linking the speech input associated with the marker to a corresponding storage area for later retrieval by the user in the context of a user interface which is dependent on the connotation of the associated marker.

A device according to the present invention has the advantage of providing a simple and convenient way of integrating voice data with other user applications so as to facilitate the management of voice data. In the embodiment to be described, the corresponding storage areas include telephone book and calendar application storage areas.

Preferably, the means for specifying a marker comprises means for selecting a marker from a set of markers. The set of markers preferably comprise iconic representations of the corresponding storage areas.

In the embodiment to be described there are means for displaying a representation of the speech input. This allows a user to view a visual representation of voice data on a desktop computer display. In that embodiment, there are means for automatically segmenting the speech input, specifically for automatically segmenting the speech input into silent and nonsilent parts.

The marker may be associated with a part of the speech input by time synchronisation. This approach conflates the selection of a marker and its association with a segment of speech data in a manner which may be particularly convenient for users. Alternatively, the marker may be associated with a part of the speech input by user input. The user input may comprise manipulation of an input device eg. dragging and dropping a marker icon on the relevant speech segment using a mouse. Alternatively, the user input may comprise means for associating a marker with a part of the speech input by spoken commands.

The linking means may comprise means for copying the speech input associated with the marker to the corresponding storage area. Alternatively, the linking means may comprise means for moving the speech input associated with the marker to the corresponding storage area. Another possibility is for the linking means to comprise means for providing a pointer to the speech input associated with the marker in the corresponding storage area. It may also be useful for the linking means to comprise means for providing an index into the original voice data containing the speech input associated with the marker.

BRIEF DESCRIPTION OF DRAWINGS

Particular embodiments of the present invention will now be described, by way of example, with reference to the accompanying drawings of which.

BEST MODE FOR CARRYING OUT THE INVENTION & INDUSTRIAL APPLICABILITY

The present invention can be implemented in the context of a "Personal Message Manager" application for browsing voice messages.

Figure 1:
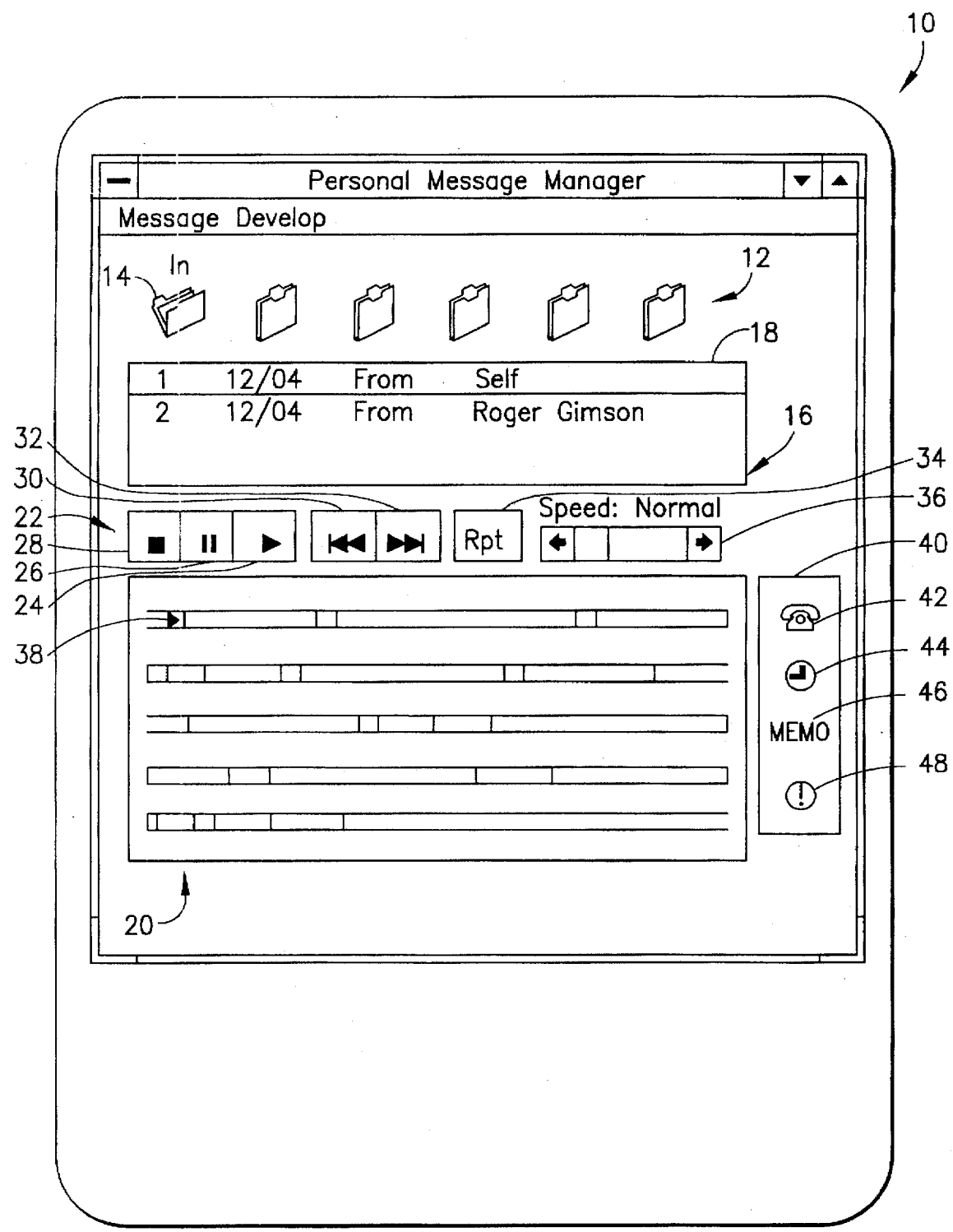
FIG. 1. depicts the user interface of a device according to a first embodiment of the present invention.
Figure 2:
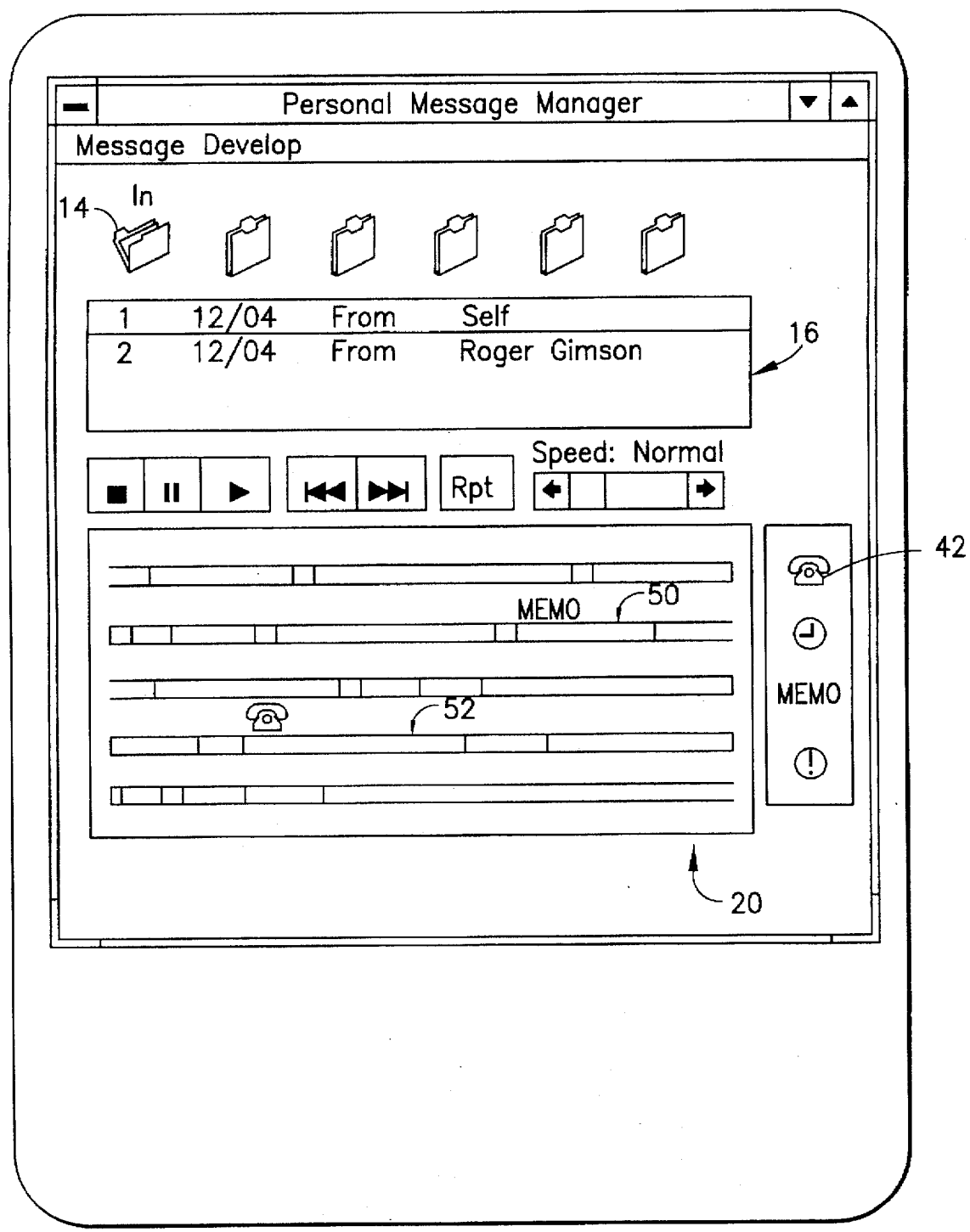
FIG. 2. depicts the user interface of FIG. 1 after labelling of two speech segments.
Figure 3:
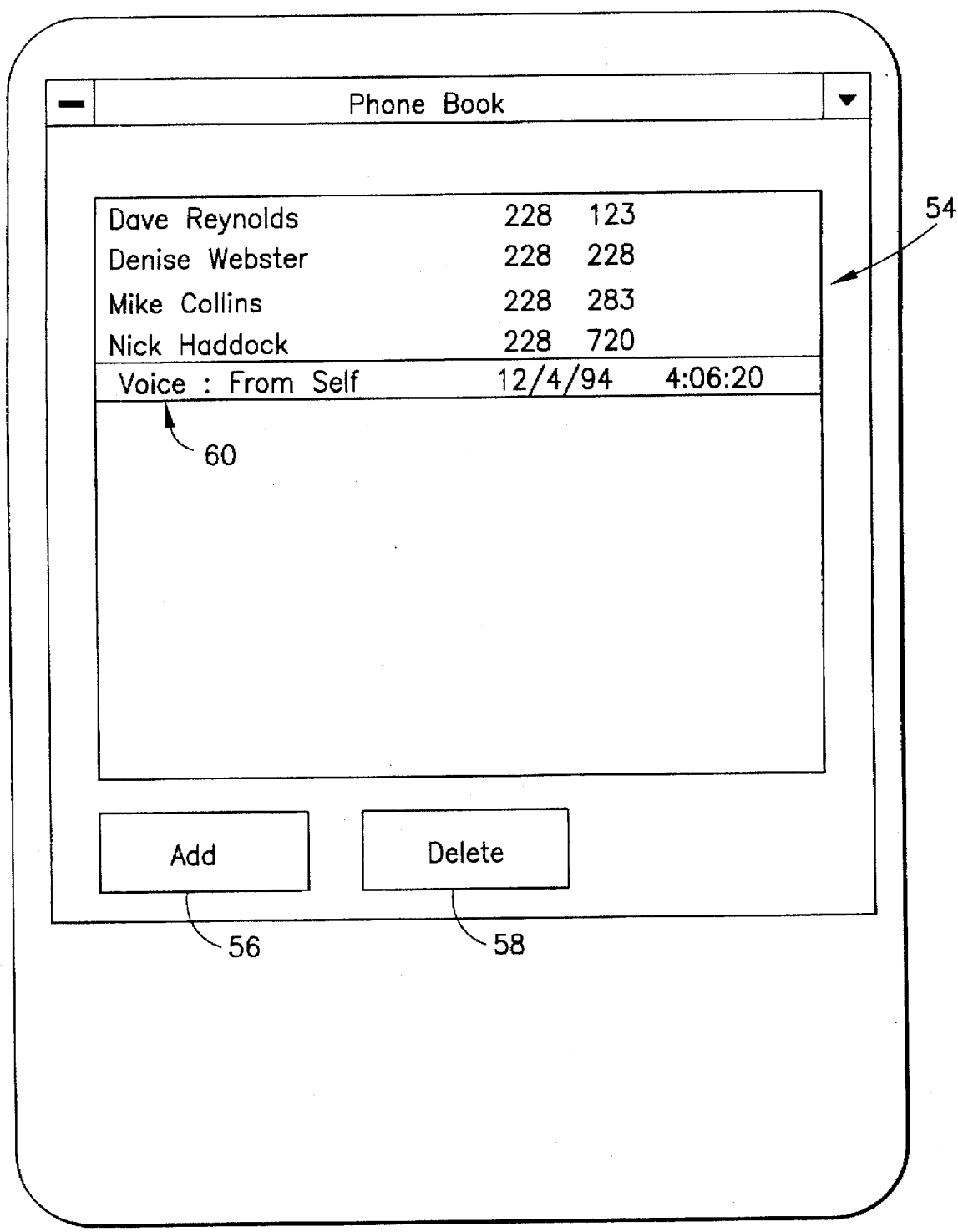
FIG. 3. depicts the user interface of a known telephone book application.

The embodiment to be described with reference to FIGS. 1 to 3 is written in Microsoft Visual Basic and Borland C on a IBM-compatible 486 25 MHz Personal Computer, and runs under the Microsoft Windows 3.1 operating system. Audio recording and playback facilities are supported by a SoundBlaster 16ASP card (Creative Labs, Inc.). These facilities are accessed through the standard MS Windows MultiMedia Application Programmers' Interface. Speech records are created using a microphone connected to the audio card, and played back via a set of speakers also connected to the card. On recording, the audio card translates the analogue audio signal produced by the microphone into a standard digital representation of the recorded speech, and stores the data in the standard ".wav" file format. The card performs the converse digital-to-analogue conversion in order to play back a digital ".wav" file through loudspeakers.

User input is by means of a mouse.

FIG. 1 shows an interaction screen 10 in a Microsoft Windows user interface. A set of folders represented by icons 12 are for storing previous voice messages. One of the folders 14 has been selected which causes the "header" information for each message in the selected folder to be displayed in a display box 16. The display box 16 displays the date of receipt and the sender of each message. FIG. 1 shows the topmost message 18 having been selected. This causes the selected message 18 to be displayed as a series of blocks in another display box 20. In the display box 20, dark blocks represent speech and white blocks represent silence. A known speech processing algorithm is utilised to distinguish between the major segments of speech and silence; such an algorithm is described in the paper by Arons (1994, Chapter 4).

Above the display box 20 is a set of audio controls 22 to allow the user to play, pause and stop speech playback. The audio controls 22 comprise the following button representations:

a play button 24;

a pause button 26;

a stop button 28;

a previous button 30 to skip playback to the previous segment of speech;

a next button 32 to skip playback to the next segment of speech;

a repeat button 34 to repeat playback of the most recently played segment of speech;

a speed control button 36 to vary the playback speed.

The user can also click directly on a segment of speech in the display box 20 eg using a mouse, to play back that specific segment. In FIG. 1, an arrow-shaped cursor 38 is shown in the display box 20 to indicate that playback is ready to commence at the beginning of the speech file. As a speech segment is being played, its colour changes to give the user a cue to the current position in the speech record.

To the right of the display box 20 is a panel 40 of markers 42,44,46,and 48 for labelling portions of the recorded speech. These can be used to provide a visual cue to the contents of a message. There are markers corresponding to a Phone Book 42, a Time/Appointment diary 44, a Memo/Reminder list 46, and a miscellaneous Points of Interest area 48. For example, one segment of the message 18 may contain a speech segment such as "If you need to get back to me, my number is 228 455." This segment could be labelled with the Phone marker 42. Whenever a marker is placed on a speech segment in the display box 20, that segment of speech is automatically linked to a corresponding application in the user's computer system. This automatic linking of speech segments to other applications using visual markers is convenient for the user and is an important step towards integrating the various applications relevant to handling voice data.

FIG. 2. depicts a situation in which the user has labelled two segments of speech, 50 and 52, the segment 50 as a Memo, and the segment 52 as a Phone item. This is accomplished by clicking the appropriate marker during playback of the relevant speech segment; the system then associates an instance of this marker with the segment of speech being played and provides a visual representation of the marker above the segment in the display box 20 as shown.

As well as providing a visual cue to the content of the speech record, placing markers against speech segments in the display box 20 automatically links the labelled segments to an appropriate computer application. For example, marking the message with the Phone label 42 as shown in FIG. 2. causes the marked segment of speech to be automatically added to a standard, textual Phone Book application, depicted in FIG. 3. The 'Phone Book' window comprises a display box 54 listing the entries in the directory and two buttons, and 'Add' button 56 and a 'Delete' button 58 for use when adding and deleting entries in the list.

Items in the display box 54 which have voice data associated with them are indicated explicitly eg item 60 in FIG. 3. Selecting such an item in the display box 54 causes the appropriate speech clip to be played back.

An advantage of the approach described above is that it provides a very quick and easy method of capturing and storing information, whilst it is listened to in spoken form. Later, at a time more convenient to the user, he/she can transcribe this portion of speech into a full textual phone book entry if desired.

In order to associate the selected marker with a specific segment of speech, it is necessary to determine the segment of speech that is currently being played. There are a number of ways in which this can be implemented and one method is described here. Assume the algorithm used for speech/silence detection (such as Arons, 1994) has produced a data file indicating the times in the speech file of speech and silence.

For example:

Speech (1): 0 millisecond (ms) to 800 ms

Silence: 801 ms to 1050 ms

Speech (2): 1051 ms to 3405 ms

Silence: 3406 ms to 3920 ms

Speech (3): 3921 ms to 6246 ms

Suppose the speech message is played back from the start of the message. At the start of the playback, an internal clock is set to 0ms to track the time. If the user selects (ie. clicks) a marker, the time is noted say, 5324 ms, and then the speech/silence data file, illustrated above, is searched to see to which segment this time corresponds. In the above example this implies that the system is currently playing the third speech segment. In this way, time-synchronization is used to associate a marker with a speech segment.

In order automatically to link to another application and subsequently to play a speech clip from that application, a visual indication of the speech within that application is provided and the relevant application must be able to play back the speech clip directly. This is accomplished using standard MS Windows programming techniques. In the Phone Book example, an automatically generated textual entry is added to the Phone Book display (for example, see item 60 in FIG. 3). In addition, in the underlying data structure, this entry is flagged as being voice data and a simple specification of where to find the appropriate voice data is recorded. This specification comprises a pointer to the original ".wav" speech file, along with a specification of start and end points within this file that represent the speech segment to be accessed. These points can be specified as times, byte positions, or other representations. When selected, the audio Application Programmers' Interface is used to play back this segment of speech from within the Phone Book application.

The embodiment described above is a voice data management device which is easy to use and which integrates voice data into other user applications in a convenient manner. Many of the features described with reference to this embodiment can be modified and categories of these will now be addressed.

1. Selection of Speech Marker

Apart from a mouse, other possible selection devices include a pen/stylus, a touch-screen and the use of the TAB key on a keyboard for iteratively cycling through menu selection options displayed to the user. Alternatively, each marker could be represented by a dedicated hard button on a device implementing the present invention and pressed during playback of recorded speech.

2. Association of Markers with Speech

In the embodiment described above, the timing of the marker selection governs the speech segment with which it is to be associated. An alternative is to allow the user actively to associate a marker with the speech segment of interest eg by "drag-and-drop". This approach is particularly useful after the message has been listened to at least once when the user is undertaking considered analysis and structuring of the speech file.

An alternative set of approaches conflate the selection and association steps. The user may select the speech segment of interest, either by explicit selection with a mouse, or implicit selection by time synchronisation, and linguistically specify the marker to be associated with that segment. The linguistic specification could be made by typing in some initial identifying characters of the name of the marker (eg. "ph" for Phone), by drawing or hand-writing the name of the marker and using handwriting recognition to determine the intended marker, or by speaking the name of the marker and using speech recognition to identify it.

A final general approach to marker association is automatically to identify the appropriate marker for a segment of speech by partially recognising the speech itself. Here techniques for "word-spotting" in continuous speech, for example based on Hidden Markov Models (cf. Wilcox and Bush, 1991), could determine the likelihood that a certain speech segment contains a telephone number. If the recognition algorithm predicts a high probablility of a phone number, the segment could be labelled automatically with the Phone marker.

3. Definition of Markers

It is anticipated that the user may be able to customise the markers and corresponding storage areas available within a system according to the present invention. A suite of icons could be made available from which the user can choose. In addition, the user could define arbitrary text labels and place these in the panel of markers. The system could also allow the user to specify the storage area associated with each marker.

4. Accessing Speech Segments from Target Application

The above description assumes that the storage application (eg. Phone Book) is provided with a link to the original speech file. There are various ways in which this could be implemented:

i) Copy—a copy of the appropriate speech data could be made and stored in a separate file;

ii) Move—a copy of the appropriate speech data could be made and stored in a separate file, and the segment could be removed from the original voice record (ie. from the voice message);

iii) Link—as in the above-described embodiment, a pointer to the same speech file can be provided.

Another approach is to treat the copied/linked speech clip as representing an index into the original message. In this case, when the clip is played back from the application (eg. the Phone Book), the user has the option of reviewing the entire message from which it was extracted. This is a useful enhancement since an automatic segmentation algorithm will sometimes produce inappropriate segmentations, for example breaking a telephone number in the middle, in which case it is important for the user to be able to continue playback (or rewind) after the linked speech clip has been played.

5. Extracting Segments from the Original Speech Record

In the above-described embodiment, the speech record is segmented into speech and silence using an algorithm such as Arons (1994, Chapter 4). Alternatively, the original speech record could be represented to the user as a continuous, unstructured line. Markers could be associated with this line using the same range of techniques described above and the only difference would be that the marker is associated with a point in the speech record rather than a segment of speech.

Automatically storing the speech associated with a marker could then be accomplished by either (a) arbitrarily defining the segment of interest eg. a 5 second clip centred on the marker point, or (b) assuming the indexing approach outlined in point (4) above, where the storage of the speech in the target application is merely a point at which to index into the original.

6. User Interface Designs

Whenever a marker is associated with a segment of speech, an instance of that marker could appear in the "header" line for the message (along with date, sender, etc). This would provide a cue to the user that the message contains eg. a phone number. A possible additional feature would be to play back every segment in the relevant message which has been associated with this type of marker on selection of the header marker by the user eg by clicking with the mouse.

Moreover, a "find" facility could be included with the Personal Message Manager which could find all messages containing a certain type of marker, or combination of marker.

7. Device without a Display

The present invention also has application in a device which lacks a display. Such a device may be useful for visually impaired people, for whom speech-based information is more useful than visual information. Speech messages could be reviewed using a set of hard buttons, similar to those used in dictaphones for example, and interesting portions of speech could be labelled using a set of hard marker buttons (as described in (1) above). Such portions could then be linked as described above to speech-based storage areas, such as a speech-based phone book.

The present invention is relevant to a range of uses of speech data. It may have particular utility for users who receive a large amount of voice mail containing similar kinds of information. This information may not need to be transcribed immediately, but it may help to store the spoken information in a structured form. For example, field staff may telephone a central office to report the time of a repair, the problem diagnosed and the work undertaken. This information could be extracted from the voice messages and categorised using the techniques described.

The invention has been described in terms of a program for handling voice messages. However, the invention is applicable to all forms of recorded speech, and the implementation described need not necessarily be part of a telecommunications system. Other possible uses include the management of voice data comprising recording of meetings, general conversations and other personal data.

I claim:

1. A device for storing speech input comprising:
   means for specifying a marker having a particular connotation;
   means for associating the marker with all or part of the speech input;
   means for automatically linking the speech input associated with the marker to a storage area such that information enabling retrieval of the speech input associated with the marker is stored in the storage area; and
   an application corresponding to the connotation of the marker which, upon execution, provides access through a user interface to the speech input associated with the marker from the information stored in said storage area in accordance with said means for automatically linking.

2. A device according to claim 1 wherein the means for specifying a marker comprises means for selecting a marker from a set of markers.

3. A device according to claim 2 wherein the set of markers comprises iconic representations of the corresponding storage areas.

4. A device according to claim 1 comprising means for displaying a representation of the speech input.

5. A device according to claim 4 comprising means for automatically segmenting the speech input.

6. A device according to claim 5 comprising means for automatically segmenting the speech input into silent and non-silent parts.

7. A device according to claim 1, further comprising means for associating a marker with a part of the speech input by time synchronization.

8. A device according to claim 1, further comprising means for associating a marker with a part of the speech input by user input.

9. A device according to claim 8 comprising means for associating a marker with a part of the speech input by manipulation of an input device.

10. A device according to claim 9 comprising means for associating a marker with a part of the speech input by spoken commands.

11. A device according to claim 1 wherein the linking means comprises means for copying the speech input associated with the marker to the corresponding storage area.

12. A device according to claim 1, wherein the linking means comprises means for moving the speech input associated with the marker to the corresponding storage area.

13. A device according to claim 1 wherein the linking means comprises means for providing a pointer to the speech input associated with the marker in the corresponding storage area.

14. A device according to claim 1 wherein the linking means comprises means for providing an index into the original voice data containing the speech input associated with the marker.

15. A device according to claim 1, wherein the device comprises a plurality of applications, each corresponding to one of a plurality of marker connotations.

16. A device according to claim 15, wherein the device comprises a plurality of storage areas for automatic linking of speech input, each of said plurality of storage areas being associated with a corresponding one of said plurality of applications.

* * * * *